(12) United States Patent
Zhu et al.

(10) Patent No.: US 12,190,472 B2
(45) Date of Patent: Jan. 7, 2025

(54) VIDEO ENHANCEMENT METHOD AND APPARATUS, AND ELECTRONIC DEVICE AND STORAGE MEDIUM

(71) Applicant: BOE TECHNOLOGY GROUP CO., LTD., Beijing (CN)

(72) Inventors: Dan Zhu, Beijing (CN); Ran Duan, Beijing (CN); Guannan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 407 days.

(21) Appl. No.: 17/630,784

(22) PCT Filed: Mar. 10, 2021

(86) PCT No.: PCT/CN2021/079872
§ 371 (c)(1),
(2) Date: Jan. 27, 2022

(87) PCT Pub. No.: WO2021/218414
PCT Pub. Date: Nov. 4, 2021

(65) Prior Publication Data
US 2022/0318950 A1   Oct. 6, 2022

(30) Foreign Application Priority Data
Apr. 30, 2020   (CN) .......................... 202010366748.9

(51) Int. Cl.
*G06T 5/50* (2006.01)
*G06T 3/4046* (2024.01)
*G06T 3/4053* (2024.01)

(52) U.S. Cl.
CPC .......... *G06T 3/4053* (2013.01); *G06T 3/4046* (2013.01); *G06T 5/50* (2013.01)

(58) Field of Classification Search
CPC ....... G06T 3/4053; G06T 3/4046; G06T 5/50; G06T 5/60; G06T 5/70; G06T 5/73;
(Continued)

(56) References Cited

U.S. PATENT DOCUMENTS 9,361,667 B2   6/2016   Aisaka et al.
10,863,897 B2   12/2020   Aisaka et al.
(Continued)

FOREIGN PATENT DOCUMENTS

| CN | 108648163 A | 10/2018 |
|---|---|---|
| CN | 109087306 A | 12/2018 |
| CN | 109493317 A | 3/2019 |
| CN | 110458771 A | 11/2019 |
| CN | 109493317 B | 7/2020 |
| EP | 2609853 A1 | 7/2013 |

OTHER PUBLICATIONS

International Search Report and Written Opinion for International Application No. PCT/CN2021/079872 mailed May 26, 2021.

*Primary Examiner* — Wesley J Tucker
*Assistant Examiner* — Han Hoang
(74) *Attorney, Agent, or Firm* — Perilla Knox & Hildebrandt LLP; Kenneth A. Knox

(57) ABSTRACT

A video enhancement method and apparatus, an electronic device, and a storage medium are described. The method comprises: extracting features from M frames of images, so as to obtain at least one first-scale image feature (S310); for each first-scale image feature, performing N-level down-sampling processing on the first-scale image feature, so as to obtain a second-scale image feature (S320); performing N-level up-sampling processing on the second-scale image feature, so as to obtain a third-scale image feature (S330), wherein the input of ith-level up-sampling processing is an image feature obtained after performing superimposition processing on the output of (N+1−i)th-level down-sampling processing and the output of (i−1)th-level up-sampling processing, and the multiple of jth-level up-sampling is the (Continued)

same as the multiple of (N+1−j)th-level down-sampling; and performing superimposition processing on the third-scale image feature and the first-scale image feature.

20 Claims, 7 Drawing Sheets

(58) Field of Classification Search
CPC . G06T 2207/20016; G06T 2207/20081; G06T 2207/20084; G06T 3/40; G06T 2207/10016; G06T 2207/20221; G06T 5/90; G06N 3/04; G06N 3/08; G06N 3/084; G06N 3/045
See application file for complete search history.

(56) References Cited

U.S. PATENT DOCUMENTS

| | | |
|---|---|---|
| 2013/0148872 A1 | 6/2013 | Aisaka et al. |
| 2016/0213244 A1 | 7/2016 | Aisaka et al. |
| 2021/0045627 A1 | 2/2021 | Aisaka et al. |
| 2021/0073944 A1* | 3/2021 | Liu ........................ G06T 3/4046 |
| 2021/0097646 A1* | 4/2021 | Choi ........................ G06T 5/50 |
| 2021/0166350 A1* | 6/2021 | Wang ........................ G06T 5/73 |
| 2021/0272246 A1* | 9/2021 | Meng ........................ G06T 5/92 |

\* cited by examiner

VIDEO ENHANCEMENT METHOD AND APPARATUS, AND ELECTRONIC DEVICE AND STORAGE MEDIUM

CROSS-REFERENCE TO THE RELATED APPLICATION

The present application is a national phase application under 35 U.S.C. § 371 of International Application No. PCT/CN2021/079872 filed on Mar. 10, 2021, which claims the benefit of and priority to Chinese Patent Application No. 202010366748.9, entitled "VIDEO ENHANCEMENT METHOD AND APPARATUS, AND ELECTRONIC DEVICE AND STORAGE MEDIUM" filed on Apr. 30, 2020, the contents of both of which being incorporated by reference in their entireties herein.

TECHNICAL FIELD

The present disclosure relates to the field of image processing technologies and, in particular, to a video enhancement method, a video enhancement apparatus, an electronic device, and a non-volatile computer-readable storage medium.

BACKGROUND

Image enhancement can purposefully emphasize overall or partial characteristics of images, make the original unclear images clear, or emphasize some features of interest such that image quality is improved and the amount of information is augmented to meet needs of some special analysis. Therefore, image enhancement technologies are widely used in various fields.

It should be noted that the information disclosed in the Background section above is only for enhancing the understanding of the background of the present disclosure, and thus may include information that does not constitute prior art known to those of ordinary skill in the art.

SUMMARY

According to a first aspect of the present disclosure, there is provided a video enhancement method, including:
  inputting M frames of images into a pre-established video processing model to obtain an enhanced image of at least one of the M frames of images, where M is an integer greater than 1;
  the inputting the M frames of images into the pre-established video processing model to obtain the enhanced image of the at least one of the M frames of images includes:
  extracting features from the M frames of images to obtain at least one first-scale image feature;
  for each first-scale image feature, performing the following procedures:
  performing N-level down-sampling processing on the first-scale image feature to obtain a second-scale image feature, where N is an integer greater than 1;
  performing N-level up-sampling processing on the second-scale image feature to obtain a third-scale image feature, wherein an input of first-level up-sampling processing is the second-scale image feature, an input of ith-level up-sampling processing is an image feature obtained after performing superimposition processing on an output of (N+1−i)th-level down-sampling processing and an output of (i−1)th-level up-sampling processing, and a magnification of jth-level up-sampling processing is the same as a minification of (N+1−j)th-level down-sampling processing, where i is an integer between 2 and N, and j is an integer between 1 and N; and
  performing the superimposition processing on the third-scale image feature and the first-scale image feature to obtain an enhanced image corresponding to the first-scale image feature.

In some embodiments, the video processing model is obtained by training an original video processing model through a target loss; the original video processing model is configured to perform video enhancement processing on an video input to the original video processing model; the target loss includes multi-level scale loss, each level of scale loss of the multi-level scale loss is loss of each level of up-sampling processing in the N-level up-sampling processing.

In some embodiments, the loss of each level of up-sampling processing is loss between a first image and a second image, and the first image is obtained by inputting M frames of sample images into the original video processing model for a corresponding level of up-sampling processing, the second image is a target image of each level of up-sampling processing, and a resolution of the first image is the same as that of the second image.

In some embodiments, training the original video processing model to obtain the trained video processing model includes:
  acquiring multiple groups of M frames of sample images and at least one frame of enhanced sample image corresponding to each group of M frames of sample images;
  for each group of M frames of sample images, extracting features from the group of M frames of sample images to obtain at least one first-scale sample image feature;
  for each first-scale sample image feature, performing the following procedures:
  performing N-level down-sampling processing on the first-scale sample image feature to obtain a second-scale sample image feature;
  performing N-level up-sampling processing on the second-scale sample image feature to obtain a predicted output image corresponding to each level of up-sampling;
  for each level of up-sampling, using a difference between a target output image corresponding to the level of up-sampling and a predicted output image corresponding to the level of up-sampling as loss of the level of up-sampling; where a target output image corresponding to ith-level up-sampling is an input of (N+1−i)th-level down-sampling processing on an enhanced sample image corresponding to the group of M frames of sample images; and
  using a sum of loss of each level of up-sampling as the target loss, and updating a network parameter value in the original video processing model according to the target loss.

In some embodiments, each group of M frames of sample images corresponds to one frame of enhanced sample image, and the one frame of enhanced sample image is specifically an enhanced image corresponding to an intermediate frame of sample image of the group of M frames of sample images, where M is an odd number greater than 1.

In some embodiments, the enhanced image corresponding to the intermediate frame of sample image of the group of M frames of sample images is specifically:

a denoising image corresponding to the intermediate frame of sample image; or a deblurred image corresponding to the intermediate frame of sample image.

In some embodiments, a value of M is 3, 5, or 7.

In some embodiments, before the inputting the M frames of images into the pre-established video processing model, the method further includes:

acquiring L frames of images in a video to be processed; adding $$\frac{M-1}{2}$$

frames of images respectively before a first frame of image and after the last frame of image of the L frames of images to obtain L+M−1 frames of images;

dividing the L+M−1 frames of images into L groups of M frames of images, where L is an integer greater than M; and for each group of M frames of images, performing the step of inputting the M frames of images into the pre-established video processing model to obtain the enhanced image of the at least one of the M frames of images.

In some embodiments, the performing the superimposition processing on the third-scale image feature and the first-scale image feature to obtain the enhanced image corresponding to the first-scale image feature includes:

performing the superimposition processing on the third-scale image feature and the first-scale image feature to obtain a superimposed feature; and converting the superimposed feature into an image feature with three channels to obtain the enhanced image corresponding to the first-scale image feature.

In some embodiments, the performing the superimposition processing on the third-scale image feature and the first-scale image feature to obtain the enhanced image corresponding to the first-scale image feature includes:

performing super-resolution processing after performing the superimposition processing on the third-scale image feature and the first-scale image feature to obtain a super-resolution image corresponding to the first-scale image feature.

In some embodiments, a value of N is 4.

According to a second aspect of the present disclosure, there is provided a video enhancement apparatus, including:

an image enhancement processor, configured to input M frames of images into a pre-established video processing model to obtain an enhanced image of at least one of the M frames of images, where M is an integer greater than 1; and the image enhancement processor is specifically configured to extract features from the M frames of images to obtain at least one first-scale image feature;

for each first-scale image feature, perform the following procedures:

performing N-level down-sampling processing on the first-scale image feature to obtain a second-scale image feature, where N is an integer greater than 1;

performing N-level up-sampling processing on the second-scale image feature to obtain a third-scale image feature, wherein an input of first-level up-sampling processing is the second-scale image feature, an input of ith-level up-sampling processing is an image feature obtained after performing superimposition processing on an output of (N+1−i)th-level down-sampling processing and an output of (i−1)th-level up-sampling processing, and a multiple of jth-level up-sampling processing is the same as a multiple of (N+1−j)th-level down-sampling processing, where i is an integer between 2 and N, and j is an integer between 1 and N; and performing the superimposition processing on the third-scale image feature and the first-scale image feature to obtain an enhanced image corresponding to the first-scale image feature.

In some embodiments, the video processing model is obtained by training an original video processing model through a target loss; the original video processing model is configured to perform video enhancement processing on an video input to the original video processing model; the target loss includes multi-level scale loss, each level of scale loss of the multi-level scale loss is loss of each level of up-sampling processing in the N-level up-sampling processing.

In some embodiments, the loss of each level of up-sampling processing is loss between a first image and a second image, and the first image is obtained by inputting M frames of sample images into the original video processing model for a corresponding level of up-sampling processing, the second image is a target image of each level of up-sampling processing, and a resolution of the first image is the same as that of the second image.

In some embodiments, the video enhancement apparatus of the embodiments of the present disclosure further includes:

a sample acquisition processor, configured to acquire multiple groups of M frames of sample images and at least one frame of enhanced sample image corresponding to each group of M frames of sample images;

a model training processor, configured to, for each group of M frames of sample images, extract features from the group of M frames of sample images to obtain at least one first-scale sample image feature;

for each first-scale sample image feature, perform the following procedures:

performing N-level down-sampling processing on the first-scale sample image feature to obtain a second-scale sample image feature;

performing N-level up-sampling processing on the second-scale sample image feature to obtain a predicted output image corresponding to each level of up-sampling;

for each level of up-sampling, using a difference between a target output image corresponding to the level of up-sampling and a predicted output image corresponding to the level of up-sampling as loss of the level of up-sampling; where a target output image corresponding to ith-level up-sampling is an input of (N+1−i)th-level down-sampling processing on an enhanced sample image corresponding to the group of M frames of sample images; and using a sum of loss of each level of up-sampling as the target loss, and updating a network parameter value in the original video processing model according to the target loss.

In some embodiments, each group of M frames of sample images corresponds to one frame of enhanced sample image, and the one frame of enhanced sample image is specifically an enhanced image corresponding to an intermediate frame of sample image of the group of M frames of sample images, where M is an odd number greater than 1.

In some embodiments, the enhanced image corresponding to the intermediate frame of sample image of the group of M frames of sample images is specifically:
- a denoising image corresponding to the intermediate frame of sample image; or
- a deblurred image corresponding to the intermediate frame of sample image.

In some embodiments, a value of M is 3, 5, or 7.

In some embodiments, the video enhancement apparatus of the embodiments of the present disclosure further includes:
- a to-be-processed video acquisition processor, configured to acquire L frames of images in a video to be processed;
- add $$\frac{M-1}{2}$$

frames of images respectively before a first frame of image and after the last frame of image of the L frames of images to obtain L+M−1 frames of images;
- a video frame division processor, configured to divide the L+M−1 frames of images into L groups of M frames of images, where L is an integer greater than M; and
- the image enhancement processor is specifically configured to, for each group of M frames of images, input the M frames of images into the pre-established video processing model to obtain the enhanced image of the at least one of the M frames of images.

In some embodiments, the image enhancement processor implements the superposition processing on the third-scale image feature and the first-scale image feature to obtain the enhanced image corresponding to the first-scale image feature through the following steps:
- performing the superimposition processing on the third-scale image feature and the first-scale image feature to obtain a superimposed feature; and
- converting the superimposed feature into an image feature with three channels to obtain the enhanced image corresponding to the first-scale image feature.

In some embodiments, the image enhancement processor implements the superimposition processing on the third-scale image feature and the first-scale image feature to obtain the enhanced image corresponding to the first-scale image feature through the following steps:
- performing super-resolution processing after performing the superimposition processing on the third-scale image feature and the first-scale image feature to obtain a super-resolution image corresponding to the first-scale image feature.

In some embodiments, a value of N is 4.

According to a third aspect of the present disclosure, there is provided an electronic device including: a processor; and a memory for storing executable instructions of the processor; wherein the processor is configured to execute any of the methods described above by executing the executable instructions.

According to a fourth aspect of the present disclosure, there is provided a non-volatile computer-readable storage medium having a computer program stored thereon, wherein the computer program, when executed by a processor, implements any of the methods described above.

It should be noted that the above general description and the following detailed description are merely exemplary and explanatory and should not be construed as limiting of the disclosure.

BRIEF DESCRIPTION OF THE DRAWINGS

The drawings here are incorporated into the specification and constitute a part of the specification, show embodiments in accordance with the present disclosure, and are used together with the specification to explain the principle of the present disclosure. Understandably, the drawings in the following description are only some embodiments of the present disclosure. For those of ordinary skill in the art, other drawings can be obtained based on these drawings without creative work.

DETAILED DESCRIPTION

Figure 1:
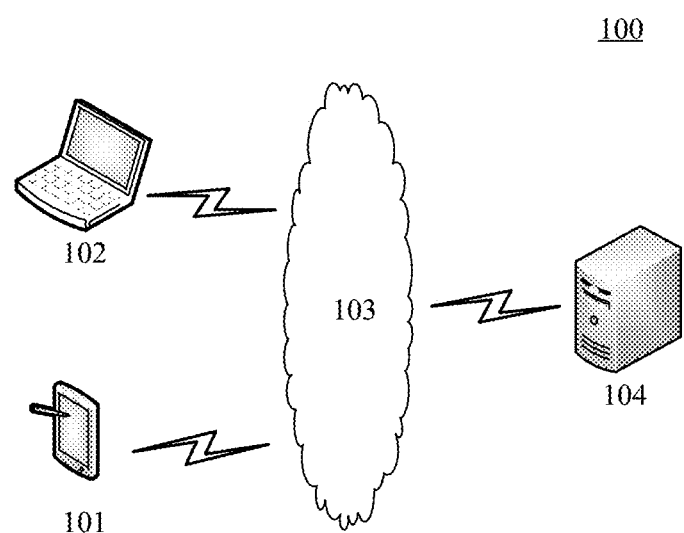
FIG. 1 shows a schematic diagram of an exemplary system architecture that can be applied to a video enhancement method according to an embodiment of the present disclosure.

Exemplary embodiments will now be described more fully with reference to the accompanying drawings. However, the exemplary embodiments can be implemented in a variety of forms and should not be construed as being limited to the examples set forth herein; rather, these embodiments are provided so that the present disclosure will be more full and complete so as to convey the idea of the exemplary embodiments to those skilled in this art. The described features, structures, or characteristics may be combined in any suitable manner in one or more embodiments. In the following description, many specific details are provided to give a full understanding of the embodiments of the present disclosure. However, those skilled in the art will appreciate that the technical solution of the present disclosure may be practiced without one or more of the specific details, or other methods, components, apparatuses, steps, and the like may be employed. In other instances, well-known structures, materials, or operations are not shown or described in detail to avoid obscuring various aspects of the present disclosure.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

In some technologies, enhancement processing can be performed on images based on convolutional neural network (CNN) algorithms. However, since a video is composed of multiple frames of images, the amount of calculation for video enhancement is relatively large and the calculation efficiency is low. Moreover, the effect of video enhancement by these algorithms is also poor.

FIG. 1 shows a schematic diagram of an exemplary system architecture that can be applied to a video enhancement method according to an embodiment of the present disclosure.

As shown in FIG. 1, a system architecture 100 may include one or more of terminal devices 101 and 102, a network 103, and a server 104. The network 103 is used to provide a medium for communication links between the terminal devices 101 and 102 and the server 104. The network 103 may include various connection types, such as wired, wireless communication links, or fiber optic cables, and so on. The terminal devices 101 and 102 may be various electronic devices with display screens including, but not limited to, portable computers, smart phones, tablet computers, and so on. It should be understood that the number of terminal devices, networks, and servers in FIG. 1 are merely illustrative, and any number of terminal devices, networks, and servers may be provided according to implementation needs. For example, the server 104 may be a server cluster composed of multiple servers.

The video enhancement method provided by the embodiments of the present disclosure may be executed by the server 104, and accordingly, a video enhancement apparatus may be provided in the server 104. However, it is easy for those skilled in the art to understand that the video enhancement method provided by the embodiments of the present disclosure can also be executed by the terminal devices 101 and 102, and accordingly, the video enhancement apparatus can also be provided in the terminal devices 101 and 102, which is not specifically limited by the embodiments. For example, in an exemplary embodiment, the user may upload a to-be-processed video to the server 104 through the terminal devices 101 and 102, and the server 104 may process the to-be-processed video by way of the video enhancement method provided by the embodiments of the present disclosure, and send the obtained enhanced video to the terminal devices 101 and 102.

The technical solutions of the embodiments of the present disclosure are described in detail below.

At present, image enhancement can include image effect enhancement and image morphology enhancement, where the image effect enhancement may include image denoising, image deblurring, image restoration, etc., and the image morphology enhancement may include image super-resolution processing, etc.

Figure 2:
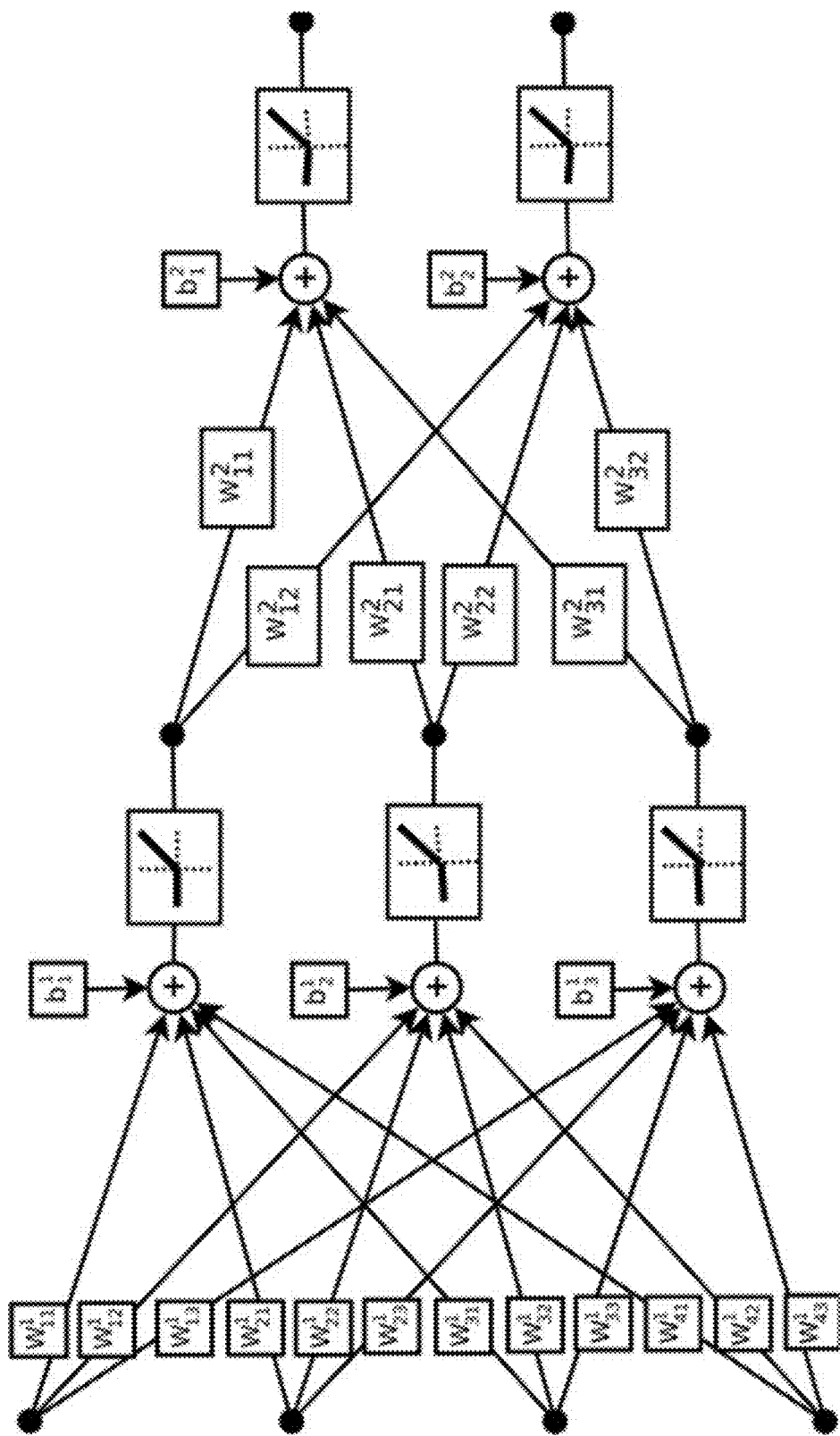
FIG. 2 shows a schematic structural diagram of a convolutional neural network.

The image enhancement can be achieved through a convolutional neural network. The convolutional neural network is a special structure of a neural network, which can take an original image and an enhanced image of the original image as an input and an output, respectively, and replace a scalar weight with a convolution kernel. A convolutional neural network with a three-layer structure is shown in FIG. 2. This network has four inputs, hidden layers have three outputs, and output layers have two outputs. Finally, the system outputs two images. Each module $w_{ij}^k$ represents one convolution kernel, where k represents an input layer number, and i and j represent unit numbers of the input and the output. A bias $b_i^k$ is a group of scalars superimposed on an output of a convolutional layer. The output of the convolutional layer superimposed with the bias can be input to an activation layer. The convolution kernel and the bias are fixed after training.

A training process is to optimize parameters of the convolution kernel and the bias through a group of matching inputs and outputs and an optimization algorithm. Under normal circumstances, each convolutional layer can contain dozens or hundreds of convolution kernels, and a deep neural network often contains more than five convolutional layers. It can be seen that an image enhancement algorithm based on the convolutional neural network has many network parameters, resulting in the low computational efficiency. Moreover, the convolutional neural network cannot extract more image features, resulting in a poor image enhancement effect.

In order to solve the foregoing problems, the embodiments of the present disclosure provide a video enhancement method which can improve the calculation efficiency of video enhancement and improve the video enhancement effect.

Specifically, M frames of images can be input into a pre-established video processing model to obtain an enhanced image of at least one of the M frames of images, where M is an integer greater than 1. The enhanced image of the at least one of the M frames of images here may be an enhanced image corresponding to an intermediate frame of the M frames of images, or an enhanced image corresponding to another frame other than the intermediate frame in the M frames of images. For example, if M is 3, it can be the second frame, and if M is 5, it can be the third frame.

Figure 3:
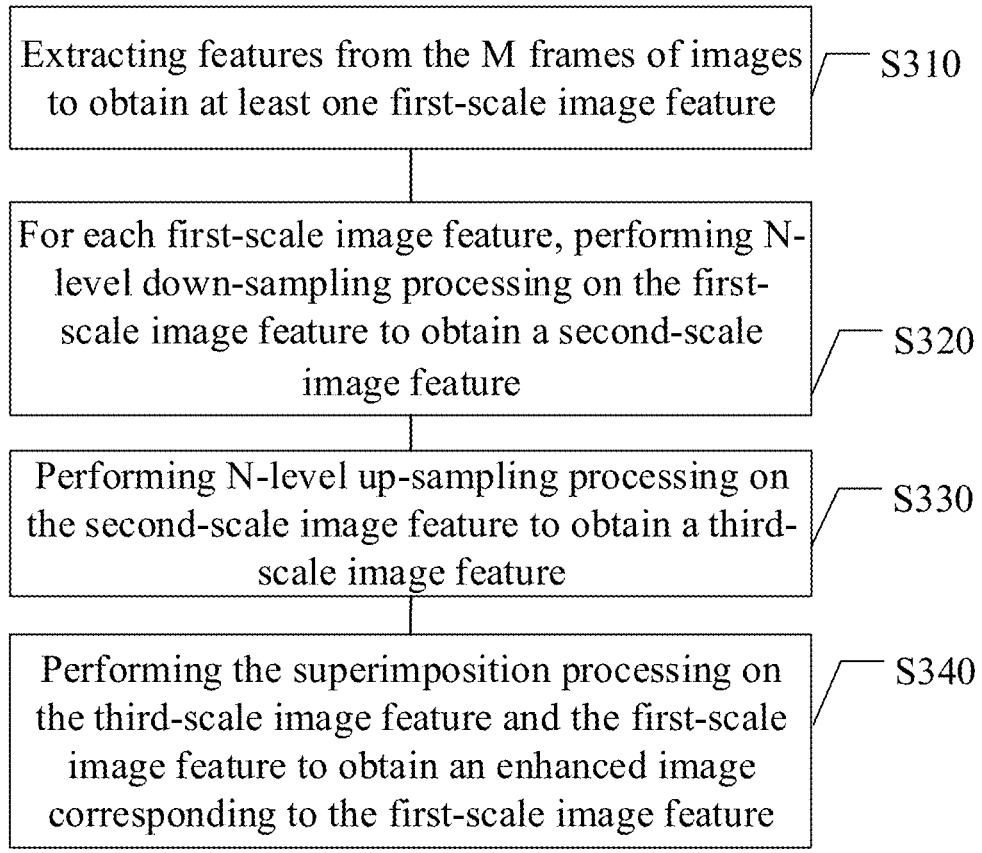
FIG. 3 shows a flowchart of a video enhancement method according to an embodiment of the present disclosure.

Referring to FIG. 3, FIG. 3 shows a flowchart of a video enhancement method according to an embodiment of the present disclosure. A processing procedure for the M frames of images by the video processing model may include the following steps.

In step S310, features are extracted from the M frames of images to obtain at least one first-scale image feature.

For each first-scale image feature, step S320 to step S340 can be performed, so that the number of enhanced images finally obtained is the same as the number of first-scale image features.

In the step S320, for each first-scale image feature, N-level down-sampling processing is performed on the first-scale image feature to obtain a second-scale image feature, where N is an integer greater than 1.

In the step S330, N-level up-sampling processing is performed on the second-scale image feature to obtain a third-scale image feature, and an input of first-level up-sampling processing is the second-scale image feature, an input of ith-level up-sampling processing is an image feature obtained after performing superimposition processing on an output of (N+1−i)th-level down-sampling processing and an output of (i−1)th-level up-sampling processing, and a magnification of jth-level up-sampling processing is the same as a minification of (N+1−j)th-level down-sampling processing, where i is an integer between 2 and N, and j is an integer between 1 and N.

In the step S340, the superimposition processing is performed on the third-scale image feature and the first-scale image feature to obtain an enhanced image corresponding to the first-scale image feature.

In the video enhancement method of the embodiments of the present disclosure, by processing the M frames of images, inter-frame continuity of the video processing can be ensured, and the occurrence of inter-frame jitter can be avoided. By performing the N-level down-sampling processing and the N-level up-sampling processing on the M frames of images, that is, performing multi-scale feature extraction, the calculation efficiency can be improved and the calculation can be accelerated. In the up-sampling processing, through the step-by-step restoration and the superimposition with the feature in the corresponding down-sampling processing, a high-level feature and a low-level feature are merged, which can improve the feature expressiveness, thereby improving the video enhancement effect.

The video enhancement method of the embodiments of the present disclosure will be described in more detail below.

In the step S310, the features are extracted from the M frames of images to obtain the at least one first-scale image feature.

In the embodiments of the present disclosure, the M frames of images may be continuous video frames. It should be noted that, in order to ensure the inter-frame continuity and avoid the inter-frame jitter, M can be a small value, for example, it can be an integer between 2 and 7. Upon the selection of the M frames of images, the current frame to be enhanced, one frame before and one frame after the current frame are selected. Alternatively, the current frame, two frames before and after the current frame are selected. Alternatively, the current frame, three frames before and after the current frame are selected. That is, a value of M can be 3, 5, or 7. In this way, the current frame can be positioned in the intermediate of the M frames of images, the deviation can be avoided to extract more and more accurate image features for enhancing the image enhancement effect. Please note that, the method for selecting the M frames of images in the present disclosure is not limited to this, and two frames of images or four frames of images can also be selected. When M is 4, the current frame, one frame before the current frame, and two frames after the current frame can be selected, or the current frame, two frames before the current frame, and one frame after the current frame can be selected. Please note that, three frames before the current frame or three frames after the current frame can also be selected, which is not limited herein.

The method for acquiring the M frames of images can be specifically as follows: first, L frames of images in a video to be processed can be acquired, where L is an integer greater than M; then the L frames of images are grouped, and each group includes the M frames of images. Since M is an integer greater than 1, the number of the final groups obtained is less than L when the grouping is performed in the above manner. As a result, when the enhancement processing is performed on the video to be processed, it leads to that the first few frames of images and the last few frames of images may not be processed. In order to avoid this problem, $$\frac{M-1}{2}$$

frames of images are added before a first frame of image and after the last frame of image of the L frames of images, respectively, so as to obtain L+M−1 frames of images; and the L+M−1 frames of images are divided into L groups of M frames of images. It can be seen that the number of the added images can be determined according to the value of M. All the images added before the first frame of image may be the first frames of images, and all the images added after the last frame of image may be the last frames of images.

For each group of M frames of images, the step of inputting the M frames of images into the pre-established video processing model to obtain the enhanced image of the at least one of the M frames of images can be performed. For each group of M frames of images, since the processing method thereof is the same, a group of M frames of images is taken as an example for illustration. It is understandable that, for the video to be processed, an enhanced video can be obtained after the enhancement processing is performed on the L groups of M frames of images. For example, for a video containing five frames of original images, that is, L=5, if M=3, the five frames of original images are represented as P1-P5 (that is, a first frame of original image P1 to a fifth frame of original image P5); in this case, the five frames of original images can be divided into five groups in the following manner: a first group P1, P1, P2; a second group P1, P2, P3; a third group P2, P3, P4; a fourth group P3, P4, P5; and a fifth group P4, P5, P5. Taking three frames of image being input the pre-established video processing model and outputting an enhanced image corresponding to the intermediate frame by the pre-established video processing model as an example, the above five groups of images are input to the pre-established video processing model to obtain an enhanced image P11 corresponding to P1 (corresponding to an output of the first group), an enhanced image P21 corresponding to P2 (corresponding to an output of the second group), an enhanced image P31 corresponding to P3 (corresponding to an output of the first group), an enhanced image P41 corresponding to P4 (corresponding to an output of the first group), and an enhanced image P51 corresponding to P5, and the enhanced video can be obtained according to these 5 frames of enhanced images P11-P51.

Figure 4:
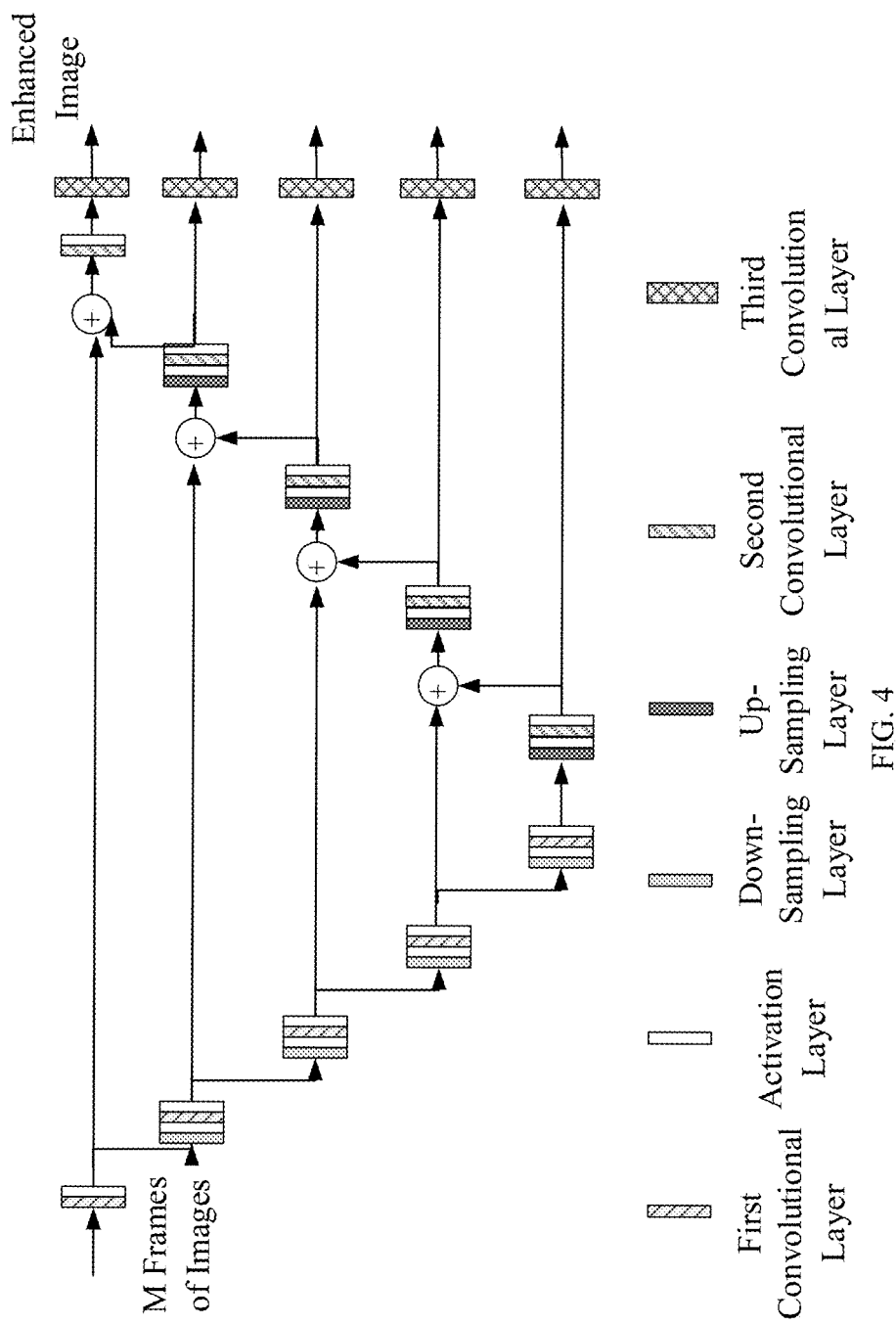
FIG. 4 shows a schematic diagram of a network structure of a video processing model according to an embodiment of the present disclosure.

Referring to FIG. 4, FIG. 4 shows a schematic diagram of a network structure of a video processing model according to an embodiment of the present disclosure. It can be seen that the network structure of the video processing model may be a U-shaped network. The following describes a processing procedure of the video processing model in conjunction with FIG. 4.

In the step S310, the features are extracted from the M frames of images to obtain the at least one first-scale image feature.

Specifically, it is assumed that a scale of each frame of image is (H, W), that is, a resolution of the image is H×W. If the M frames of images are all RGB images, a value of the number of channels C of the image is three. If the M frames of images are all grayscale images, the value of C is 1. The M frames of images can be combined in the C channels, and the M frames of images input to the video processing model can be expressed as (H, W, C*M), where C*M represents the number of feature layers. For example, when M is 3 and C is 3, the number of feature layers is 9.

When the features are extracted from the M frames of images, the number of feature layers can be expanded without changing the resolution of the image. Therefore, the first scale is (H, W). For example, the number of feature layers can be expanded from C*M to F. In this way, the input M frames of images changes from (H, W, C*M) to (H, W, F), where F is a preset value, such as 64 or 128.

In an implementation of the present disclosure, the number of feature layers can be changed through a convolution operation. Specifically, a convolution process can be performed on the M frames of images to obtain the first-scale image feature. A size of the convolution kernel in the convolution process can be 3×3 or the like. Since an activation function can introduce a non-linear factor to a neuron, the neural network can approach any non-linear function arbitrarily. Therefore, after the convolution processing is performed on the M frames of images, an activation operation can also be performed to obtain the first-scale image feature. The activation function can be a ReLU (linear rectification function) function or a sigmoid function. It should be noted that the method for performing the feature extraction on the M of frame images in the present disclosure is not limited to this.

It should be noted that the number of first-scale image features may be one or multiple. When there are multiple first-scale image features, each first-scale image feature may correspond to a feature of a different image. For example, when M is 5, the first-scale image feature may include: a feature of a second frame of image and a feature of a third frame of image. For each first-scale image feature, the step S320 to step S340 can be performed, so that an enhanced image of the second frame of image and an enhanced image of the third frame of image can be obtained. The number of finally obtained enhanced images is the same as the number of first-scale image features. In the embodiments of the present disclosure, one first-scale image feature is taken for illustration.

In the step S320, the N-level down-sampling processing is performed on the first-scale image feature to obtain the second-scale image feature, where N is an integer greater than 1.

In the embodiments of the present disclosure, the N-level down-sampling refers to performing the down-sampling for N times. After each down-sampling, a smaller feature than the original image can be obtained, which is equivalent to compressing the image, and a region per unit area that can be sensed becomes larger. In this way, after the N-level down-sampling, more contour information can be obtained. In an implementation of the present disclosure, in order to retain more detail information, a step value may be 2, that is, a multiple of the down-sampling may be 2. For example, for the first-scale image feature (H, W) a $$\left(\left[\frac{H}{2}\right], \left[\frac{W}{2}\right]\right)$$

-scale image feature can be obtained after 2-multiple down-sampling, where [ ] represents a rounding operation. Note that, the present disclosure does not specifically limit the multiple of the down-sampling.

It can be understood that the larger the value of N, that is, the more down-sampling times, the larger the region per unit area that can be sensed, and the more the contour information that can be obtained. However, the greater the number of down-sampling times, the more computing resources that are required. Experiments show that when the value of N is 4, less computing resources can be used while obtaining more contour information. Therefore, in the embodiments of the present disclosure, the value of N may be 4. Referring to FIG. 4, the network structure is the U-shaped network when N is 4. In this way, when the down-sampling multiple is 2, scales of the image features obtained through the 4-level down-sampling processing are:

$$\left(\left[\frac{H}{2}\right], \left[\frac{W}{2}\right]\right), \left(\left[\frac{H}{4}\right], \left[\frac{W}{4}\right]\right), \left(\left[\frac{H}{8}\right], \left[\frac{W}{8}\right]\right) \text{ and } \left(\left[\frac{H}{16}\right], \left[\frac{W}{16}\right]\right)$$

in sequence. In this case, the second-scale image feature is $$\left(\left[\frac{H}{16}\right], \left[\frac{W}{16}\right]\right).$$

It should be noted that after each level of down-sampling processing, the activation operation and the convulsion processing can also be performed on the image feature after the down-sampling. Referring to FIG. 4, after a down-sampling layer, an activation layer, a first convolutional layer, and another activation layer can also be included. The activation function in the activation layer can be the ReLU function, etc., and the size of the convolution kernel in the first convolutional layer can be 3×3 or the like. Please note that, in addition to the network structure shown in FIG. 4, after the down-sampling layer, other network structures such as a convolution layer, an activation layer, and a pooling layer may also be included.

In the step S330, the N-level up-sampling processing is performed on the second-scale image feature to obtain the third-scale image feature. The input of ith-level up-sampling processing is the image feature obtained after performing superimposition processing on the output of (N+1−i)th-level down-sampling processing and the output of (i−1)th-level up-sampling processing, where i is an integer between 2 and N.

In the embodiments of the present disclosure, the N-level up-sampling corresponds to the above-mentioned N-level down-sampling. The N-level up-sampling refers to performing the up-sampling for N times, the first-level up-sampling refers to performing the up-sampling for the first time. The input of the first-level up-sampling processing is the second-scale image feature. The jth-level down-sampling and the (N+1−j)th-level up-sampling are located in the same layer of the U-shaped network, and the magnification of the jth-level up-sampling processing is the same as the minification of the (N+1−j)th-level down-sampling processing. In this way, the resolution of the image before the jth-level down-sampling processing is the same as the resolution of the image after the (N+1−j)th-level up-sampling processing. Alternatively, the resolution of the image after the jth-level down-sampling processing is the same as the resolution of the image after the (N+1−j)th-level up-sampling processing, where j is an integer between 1 and N.

In the up-sampling process, for the ith-level up-sampling, the output of (N+1−i)th-level down-sampling processing and the output of (i−1)th-level up-sampling processing can be superimposed and used as the input of ith-level up-sampling processing. For example, in FIG. 4, the input of the second-level up-sampling processing is the superposition of the output of the third-level down-sampling processing and the output of the first-level up-sampling processing. In the embodiments of the present disclosure, the superposition processing refers to the fusion processing of two features, which may be the feature superposition or the like. For example, the output of the third-level down-sampling processing is (a1, a2, a3), the output of the first-level up-sampling processing is (b1, b2, b3), and the two are superimposed to be (a1+b1, a2+b2, a3+b3).

In this way, the image features of each stage of the down-sampling can be superimposed during the up-sampling process, that is, in the up-sampling process, the image features of individual levels can be combined, so that the accuracy of the image feature extraction can be improved.

It should be noted that the rounding operation is performed during the down-sampling processing, and then upon the superposition, a scale corresponding to the output of the (N+1−i)th-level down-sampling processing may be different from a scale corresponding to the output of the (i−1)th-level up-sampling processing. In this case, the output of the (N+1−i)th-level down-sampling processing can be cropped first, so that the cropped scale is the same as the scale corresponding to the output of the (i−1)th-level up-sampling processing.

For example, it is assumed that a resolution corresponding to the output of the third-level down-sampling processing is 10×10, a resolution corresponding to the output of the first-level up-sampling processing is 8×8. In order to make the two features smoothly stitched, the 10×10 can be cropped to obtain a center part thereof (with a size of 8×8) and the stitching can be performed.

It should be noted that after the above-mentioned N-level down-sampling and N-level up-sampling, a scale of the obtained image feature is less than or equal to the first scale. That is, the third scale may be less than or equal to the first scale. For example, in the down-sampling process, when there is no rounding operation, the third scale is the same as the first scale, that is, (H, W). When there is the rounding operation, the third scale may be smaller than the first scale due to the feature cropping.

In the embodiments of the present disclosure, corresponding to the down-sampling processing procedure, after the up-sampling processing, the convolution processing and the activation operations can also be performed. Referring to FIG. 4, after an up-sampling layer, an activation layer, a second convolutional layer, and another activation layer can also be included. The activation function in the activation layer can be the ReLU function, etc., the size of the convolution kernel in the second convolutional layer can be 4×4 or the like. Note that, in addition to the network structure shown in FIG. 4, after the up-sampling layer, other network structures may also be included, which are not limited here.

In the step S340, the superimposition processing is performed on the third-scale image feature and the first-scale image feature to obtain the enhanced image corresponding to the first-scale image feature.

In the embodiments of the present disclosure, the third-scale image feature and the first-scale image feature can be directly superimposed to obtain the superimposed feature; the superimposed feature is converted into an image feature with three channels to obtain the enhanced image corresponding to the first-scale image feature. Specifically, in the above process, the F value remains unchanged. Therefore, the superimposed feature can be converted into the image feature containing the three channels through the convolution processing. For example, a three-channel RGB image can be output.

It can be noted that, in the embodiments of the present disclosure, after each level of up-sampling, the corresponding convolution operation can be performed, and the convolution operation can be used to convert the number of feature layers from F to 3, that is, the three-channel image feature is outputted. Moreover, parameters in the convolution operation after each level of up-sampling may be shared. For example, as shown in FIG. 4, after each level of up-sampling, the same third convolutional layer is included. In this way, parameter sharing can reduce parameters in the video processing model and speed up the network training process.

The video processing model can be obtained by training an original video processing model through a target loss; the original video processing model is configured to perform the video enhancement processing on an video input to the original video processing model; the target loss includes multi-level scale loss, each level of scale loss of the multi-level scale loss is loss of each level of up-sampling processing in the N-level up-sampling processing.

Specifically, the loss of each level of up-sampling processing is loss between a first image and a second image. The first image is obtained by inputting M frames of sample images into the original video processing model for a corresponding level of up-sampling processing, that is, after each level of up-sampling, a corresponding first image can be output. Note that, resolutions of first images corresponding to different levels of up-sampling are different. In addition, each level of up-sampling has a corresponding second image, and the second image is a target image of each level of up-sampling processing, and the resolution of the first image is the same as that of the second image.

During training, enhanced sample images corresponding to the M frames of sample images can also be acquired, and the N−1-level down-sampling can be performed on the enhanced sample images to obtain N−1 images with different resolutions. The N−1 images with different resolutions and the enhanced sample images can be used as N target images. For example, the N−1-level down-sampling is performed on the enhanced sample images to obtain a target image of the first-level up-sampling processing, the first-level down-sampling is performed on the enhanced sample images to obtain a target image of the (N−1)th-level up-sampling processing. The enhanced sample image can be used as the target image of the Nth-level up-sampling processing.

The following is a detailed introduction to the training method for the video processing model.

Figure 5:
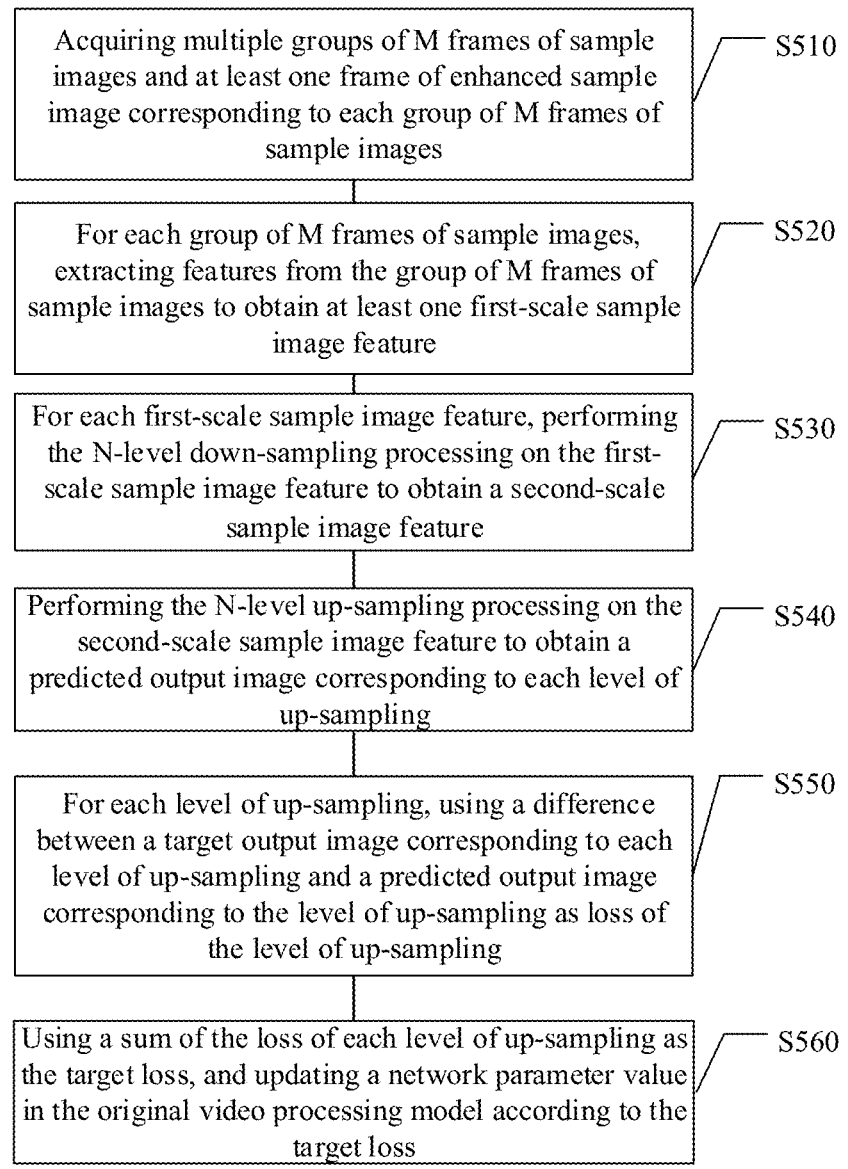
FIG. 5 shows a flowchart of a training method for a video processing model according to an embodiment of the present disclosure.

Referring to FIG. 5, FIG. 5 shows a flowchart of a training method for a video processing model according to an embodiment of the present disclosure, which may include the following steps.

In step S510, multiple groups of M frames of sample images and at least one frame of enhanced sample image corresponding to each group of M frames of sample images are acquired.

Since the input of the video processing model can be multiple frames of images, the output is one or more frames of enhanced images. Correspondingly, during the training process, sample data including the M frames of sample images and corresponding one or more frames of enhanced sample images can be acquired. When the output of the video processing model is one frame of enhanced image, one frame of enhanced sample image corresponding to each group of M frames of sample images may specifically be an enhanced image corresponding to the intermediate frame of sample image of the group of M frames of sample images. In addition, it can also be an enhanced image corresponding to a frame other than the intermediate frame of sample image. When the output of the video processing model is the multiple frames of enhanced images, the multiple frames of enhanced sample images corresponding to each group of M frames of sample images can be specifically the enhanced image corresponding to the intermediate frame of sample image of the group of M frames of sample images. In addition, it can also be an enhanced image of other enhanced sample images. The present disclosure takes the video processing model outputting one frame of enhanced image as an example for illustration.

It should be noted that the purpose of the video processing model is different, and accordingly, the enhanced sample image used may also be different. For example, if the video processing model to be trained is used for video denoising, the enhanced image corresponding to the intermediate frame of sample image of each group of M frames of sample images is specifically a denoising image corresponding to the intermediate frame of sample image. If the video processing model to be trained is used for video deblurring, the enhanced image corresponding to the intermediate frame of sample image of each group of M frames of sample images is specifically a deblurred image corresponding to the intermediate frame of sample image. Note that, the video processing model of the embodiments of the present disclosure is not limited to this.

In the step S520, for each group of M frames of sample images, features are extracted from the group of M frames of sample images to obtain at least one first-scale sample image feature.

For each first-scale sample image feature, steps S530 to S560 are executed:

In the step S530, for each first-scale sample image feature, the N-level down-sampling processing is performed on the first-scale sample image feature to obtain a second-scale sample image feature.

In the embodiments of the present disclosure, a batch size for model training (that is, the amount of sample data simultaneously input to the model) can be set. Assuming that the batch size is B, the size of the final input model is (B, H, W, C*M).

Since the processing procedure for each group of M frames of sample images in the step S520 to the step S530 is similar to the processing procedure of the step S310 to the step S320 described above, reference may be made to the description in the step S310 to the step S320 for details, which will not be repeated here.

In the step S540, the N-level up-sampling processing is performed on the second-scale sample image feature to obtain a predicted output image corresponding to each level of up-sampling.

As mentioned above, after each level of up-sampling, the corresponding convolution operation can be performed, and the convolution processing can be performed on the output feature of this level of up-sampling according to this convolution operation to obtain the multi-scale predicted output image. Assuming that for a network with N being 4, during the training process, from top to bottom, five images with different scales F1, F2, F3, F4, F5 can be output, and the five scales are: (H, W), $$\left(\left[\frac{H}{2}\right], \left[\frac{W}{2}\right]\right), \left(\left[\frac{H}{4}\right], \left[\frac{W}{4}\right]\right), \left(\left[\frac{H}{8}\right], \left[\frac{W}{8}\right]\right) \text{ and}$$

$$\left(\left[\frac{H}{16}\right], \left[\frac{W}{16}\right]\right)$$

In the step S550, for each level of up-sampling, a difference between a target output image corresponding to the level of up-sampling and a predicted output image corresponding to the level of up-sampling is used as loss of the level of up-sampling; where a target output image corresponding to ith-level up-sampling is an input of (N+1−i)th-level down-sampling processing on an enhanced sample image corresponding to the group of M frames of sample images.

In the embodiments of the present disclosure, the target output image corresponding to the ith-level up-sampling is an image that can be output under ideal conditions, and specifically may be the input of (N+1−i)th-level down-sampling processing on an enhanced sample image corresponding to the group of M frames of sample images.

For example, for any M frames of sample images and the corresponding enhanced sample image, the target output image corresponding to the first-level up-sampling may be an input of performing the N-level down-sampling processing on the enhanced sample image, that is, an output of performing the N−1-level down-sampling processing on the enhanced sample image.

In the training process, there is usually a deviation between the predicted output image and the target output image. The larger the difference, the more inconsistent the predicted output image and the target output image; the smaller the difference, the more consistent the predicted output image and the target output image.

In the step S560, a sum of loss of each level of up-sampling is used as the target loss, and a network parameter value in the original video processing model is updated according to the target loss.

In the training process, the gradient descent method can be used to continuously calculate the loss according to a back propagation principle, and the network parameter values is updated according to the loss. After the training is completed, when the loss value meets the requirements, for example, is less than a preset threshold, the video processing model can be obtained. The preset threshold can be set according to actual applications, which is not limited here. In the embodiments of the present disclosure, the multi-scale loss can be used to approximate small-scale features layer by layer, which facilitates to better restore the details of high-definition images, thereby improving the video enhancement effect.

Figure 6:
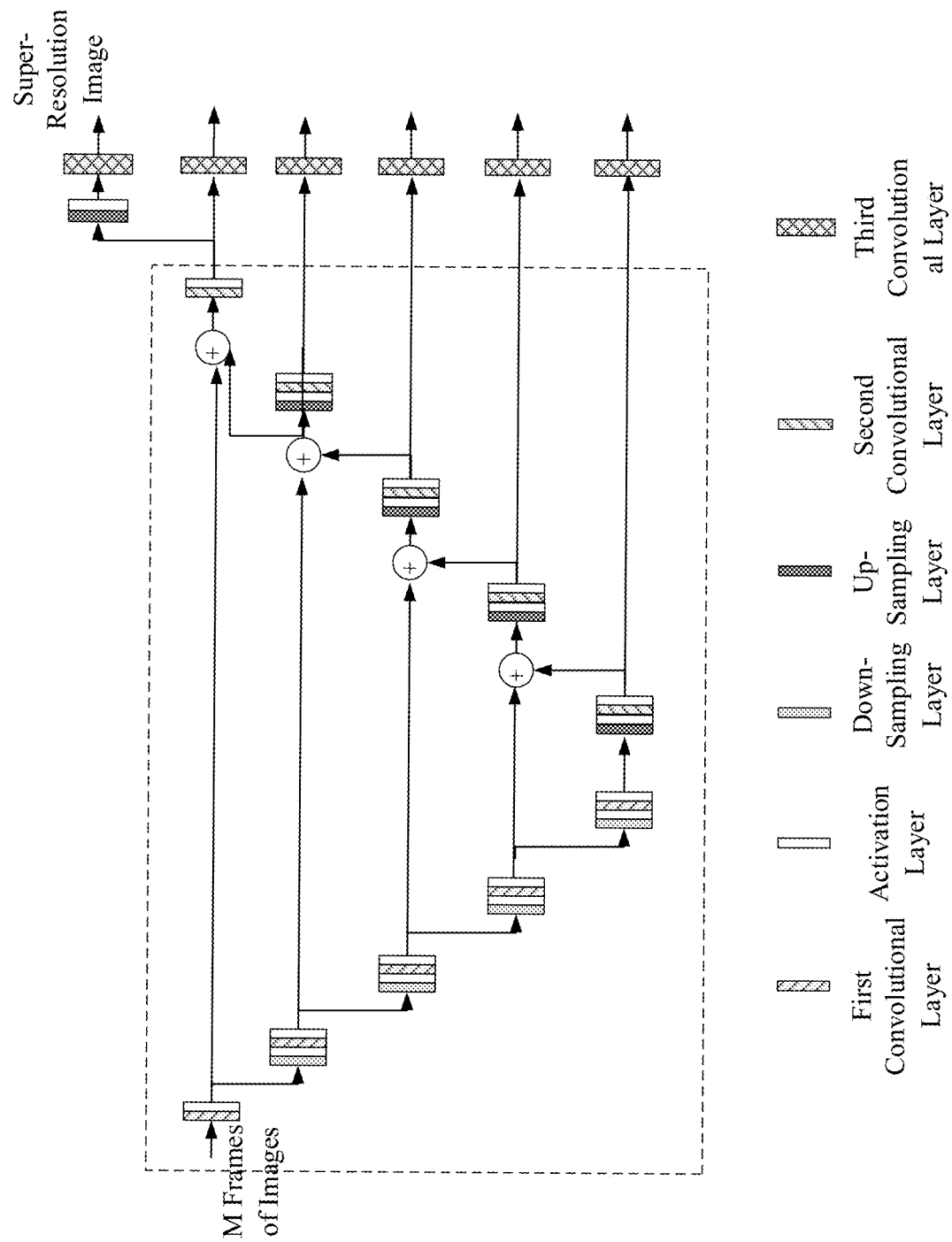
FIG. 6 shows a schematic diagram of another network structure of a video processing model according to an embodiment of the present disclosure.

Referring to FIG. 6, FIG. 6 shows a schematic diagram of another network structure of a video processing model according to an embodiment of the present disclosure. It can be seen that, compared with the network structure shown in FIG. 4, after the Nth-level up-sampling processing, an up-sampling layer is added. In this case, the video processing model can be used for video super-resolution processing.

On this basis, the step S350 may specifically include performing the superimposition processing on the third-scale image feature and the first-scale image feature to obtain an enhanced image corresponding to the first-scale image feature. In this way, if M frames of images with a resolution of H×W are input, one or more frames of super-resolution images with a resolution of 2H×2 W can be output.

Correspondingly, the enhanced sample image in the sample data used in training may be the super-resolution image of the intermediate frame of the corresponding M frames of sample images. Moreover, for the network structure shown in FIG. 6, its training process is similar to the training process of the network structure shown in FIG. 4. For example, the parameters in the convolution operation after each level of up-sampling can be shared, and the sum of loss of each level of up-sampling is used as the final loss, and the network parameter value is updated according to the final loss. For details, reference may be made to the description in the embodiment of FIG. 5, which will not be repeated here. After training, the video processing model for super-resolution processing can be obtained.

The video enhancement method of the embodiments of the present disclosure can save the calculation speed and improve the calculation efficiency through the U-shaped network in a better way. In addition, calculating the multi-scale loss can improve the effect of the output image to the maximum extent. The present disclosure can be used for multiple video enhancement functions such as the video denoising, the video deblurring, and the video super-resolution processing.

It should be noted that although various steps of the method of the present disclosure are described in a particular order in the figures, this is not required or implied that these steps must be performed in the specific order, or all the steps shown must be performed to achieve the desired result. Additionally or alternatively, certain steps may be omitted, multiple steps may be combined into one step, and/or one step may be decomposed into multiple steps and so on.

Figure 7:
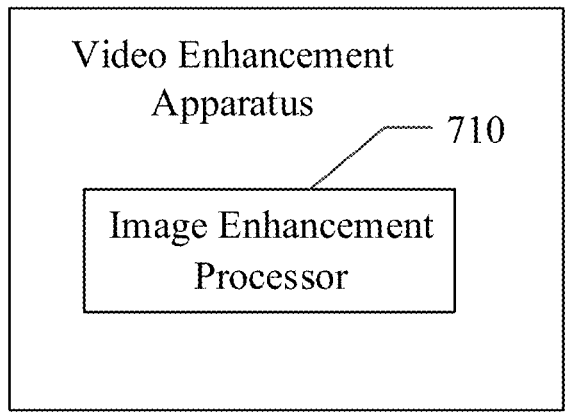
FIG. 7 shows a schematic structural diagram of a video enhancement apparatus according to an embodiment of the present disclosure.

Further, in this exemplary embodiment, there is also provided a video enhancement apparatus 700, as shown in FIG. 7, including:

an image enhancement processor 710, configured to input M frames of images into a pre-established video processing model to obtain an enhanced image of at least one of the M frames of images, where M is an integer greater than 1; and the image enhancement processor 710 is specifically configured to extract features from the M frames of images to obtain at least one first-scale image feature;

for each first-scale image feature, perform the following procedures:

performing N-level down-sampling processing on the first-scale image feature to obtain a second-scale image feature, where N is an integer greater than 1;

performing N-level up-sampling processing on the second-scale image feature to obtain a third-scale image feature, and an input of first-level up-sampling processing is the second-scale image feature, an input of ith-level up-sampling processing is an image feature obtained after performing superimposition processing on an output of (N+1−i)th-level down-sampling processing and an output of (i−1)th-level up-sampling processing, and a multiple of jth-level up-sampling processing is the same as a multiple of (N+1−j)th-level down-sampling processing, where i is an integer between 2 and N, and j is an integer between 1 and N; and performing the superimposition processing on the third-scale image feature and the first-scale image feature to obtain an enhanced image corresponding to the first-scale image feature.

In an exemplary embodiment of the present disclosure, the video processing model is obtained by training an original video processing model through a target loss; the original video processing model is configured to perform video enhancement processing on an video input to the original video processing model; the target loss includes multi-level scale loss, each level of scale loss of the multi-level scale loss is loss of each level of up-sampling processing in the N-level up-sampling processing.

In an exemplary embodiment of the present disclosure, the loss of each level of up-sampling processing is loss between a first image and a second image, and the first image is obtained by inputting M frames of sample images into the original video processing model for a corresponding level of up-sampling processing, the second image is a target image of each level of up-sampling processing, and a resolution of the first image is the same as that of the second image.

In an exemplary embodiment of the present disclosure, the video enhancement apparatus further includes:

a sample acquisition processor, configured to acquire multiple groups of M frames of sample images and at least one frame of enhanced sample image corresponding to each group of M frames of sample images;

a model training processor, configured to, for each group of M frames of sample images, extract features from the group of M frames of sample images to obtain at least one first-scale sample image feature;

for each first-scale sample image feature, perform the following procedures:

performing N-level down-sampling processing on the first-scale sample image feature to obtain a second-scale sample image feature;

performing N-level up-sampling processing on the second-scale sample image feature to obtain a predicted output image corresponding to each level of up-sampling;

for each level of up-sampling, using a difference between a target output image corresponding to the level of up-sampling and a predicted output image corresponding to the level of up-sampling as loss of the level of up-sampling; where a target output image corresponding to ith-level up-sampling is an input of (N+1−i)th-level down-sampling processing on an enhanced sample image corresponding to the group of M frames of sample images; and using a sum of loss of each level of up-sampling as the target loss, and updating a network parameter value in the original video processing model according to the target loss.

In an exemplary embodiment of the present disclosure, each group of M frames of sample images corresponds to one frame of enhanced sample image, and the one frame of enhanced sample image is specifically an enhanced image corresponding to an intermediate frame of sample image of the group of M frames of sample images, where M is an odd number greater than 1.

In an exemplary embodiment of the present disclosure, the enhanced image corresponding to the intermediate frame of sample image of the group of M frames of sample images is specifically:

a denoising image corresponding to the intermediate frame of sample image; or a deblurred image corresponding to the intermediate frame of sample image.

In an exemplary embodiment of the present disclosure, a value of M is 3, 5, or 7.

In an exemplary embodiment of the present disclosure, the video enhancement apparatus further includes:

a to-be-processed video acquisition processor, configured to acquire L frames of images in a video to be processed;

add $$\frac{M-1}{2}$$

frames of images respectively before a first frame of image and after the last frame of image of the L frames of images to obtain L+M−1 frames of images;

a video frame division processor, configured to divide the L+M−1 frames of images into L groups of M frames of images, where L is an integer greater than M; and the image enhancement processor is specifically configured to, for each group of M frames of images, input the M frames of images into the pre-established video processing model to obtain the enhanced image of the at least one of the M frames of images.

In an exemplary embodiment of the present disclosure, the image enhancement processor implements the superposition processing on the third-scale image feature and the first-scale image feature to obtain the enhanced image corresponding to the first-scale image feature through the following steps:

performing the superimposition processing on the third-scale image feature and the first-scale image feature to obtain a superimposed feature; and converting the superimposed feature into an image feature with three channels to obtain the enhanced image corresponding to the first-scale image feature.

In an exemplary embodiment of the present disclosure, the image enhancement processor implements the superimposition processing on the third-scale image feature and the first-scale image feature to obtain the enhanced image corresponding to the first-scale image feature through the following steps including:

performing super-resolution processing after performing the superimposition processing on the third-scale image feature and the first-scale image feature to obtain a super-resolution image corresponding to the first-scale image feature.

It should be noted that the scale in all the embodiments of the present disclosure can be understood as a resolution of the corresponding image.

In an exemplary embodiment of the present disclosure, a value of N is 4.

The specific details of each processor in the above-mentioned apparatus have been described in detail in the corresponding method, and therefore will not be repeated here.

It should be noted that each processor in the above-mentioned apparatus can be a general-purpose processor, including: a central processing unit, a network processor, etc.; it can also be a digital signal processor, an application specific integrated circuit, a field programmable gate array, or other programmable logic devices, discrete gates or transistor logic devices, discrete hardware components. Each processor in the above-mentioned apparatus may be an independent processor, or may be integrated together.

It should be noted that although several modules or units of devices for executing actions are mentioned in the above detailed description, such division of modules or units is not mandatory. In fact, features and functions of two or more modules or units described above may be embodied in one module or unit in accordance with the embodiments of the present disclosure. Conversely, the features and functions of one module or unit described above may be further divided into multiple modules or units to be embodied.

In an exemplary embodiment of the present disclosure, there is also provided an electronic device, including: a processor; and a memory for storing executable instructions of the processor. The processor is configured to execute all or part of steps of the video enhancement method in this exemplary embodiment.

Figure 8:
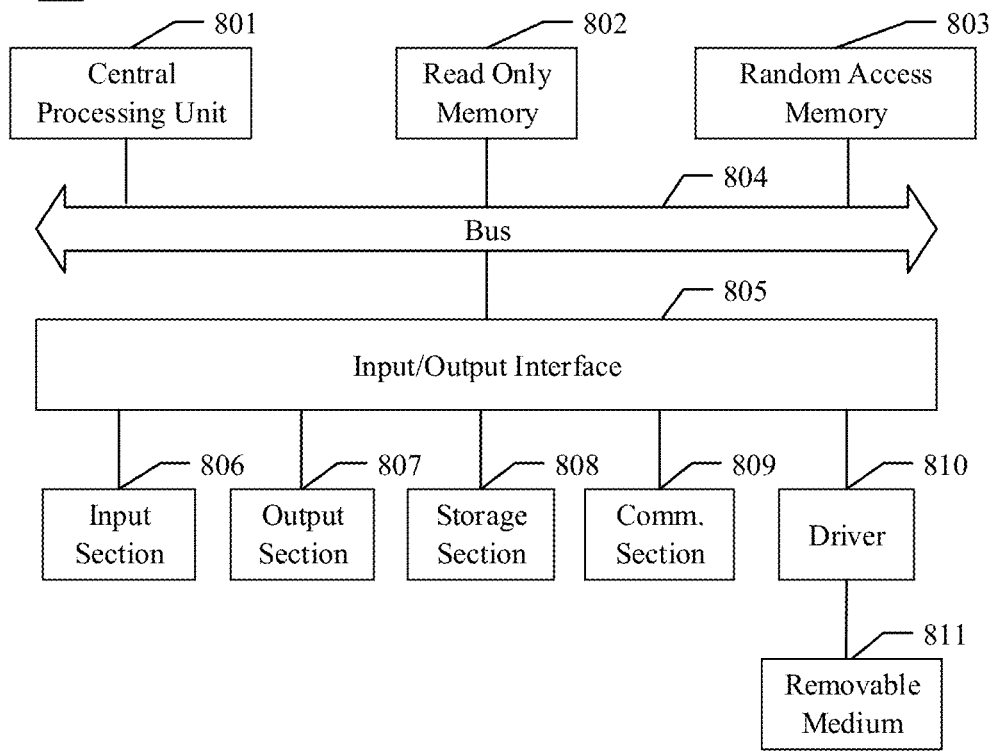
FIG. 8 shows a schematic structural diagram of a computer system suitable for implementing an electronic device according to an embodiment of the present disclosure.

FIG. 8 shows a schematic structural diagram of a computer system for implementing an electronic device according to an embodiment of the present disclosure. It should be noted that a computer system 800 of an electronic device shown in FIG. 8 is only an example, and should not bring any limitation to functions and scope of use of the embodiments of the present disclosure.

As shown in FIG. 8, the computer system 800 includes a central processing unit 801 that can perform various appropriate actions and processes according to a program stored in a read only memory 802 or a program loaded from a storage section 808 into a random access memory 803. In the random access memory 803, various programs and data necessary for system operations are also stored. The central processing unit 801, the read only memory 802 and the random access memory 803 are connected to each other via a bus 804. An input/output interface 805 is also connected to the bus 804.

The following parts are connected to the input/output interface 805: an input section 806 including a keyboard, a mouse, and the like; an output section 807 including, for example, a cathode ray tube (CRT), a liquid crystal display (LCD) and a speaker; the storage section 808 such as a hard disk; and a communication section 809 including a network interface card such as a local area network (LAN) card, a modem, or the like. The communication section 809 performs communication processing via a network such as Internet. A driver 810 is also connected to the input/output interface 805 as needed. A removable medium 811 such as a magnetic disk, an optical disk, a magneto-optical disk, a semiconductor memory, or the like is mounted on the driver 810 as needed, so that the computer program read out therefrom is installed into the storage section 808 as needed.

In particular, the processes described with reference to the above flowcharts may be implemented as computer software programs according to the embodiments of the present disclosure. For example, the embodiments of the present disclosure include a computer program product including a computer program carried on a computer-readable medium, the computer program including a program code for performing the method illustrated in the flowchart. In such an embodiment, the computer program may be downloaded and installed from a network via the communication section 809, and/or installed from the removable medium 811. The computer program, when executed by the central processing unit 801, executes various functions defined in the apparatus of the present disclosure.

In an exemplary embodiment of the present disclosure, there is also provided a non-volatile computer-readable storage medium having a computer program stored thereon, and the computer program, when executed by a processor, implements any of the methods described above.

It should be noted that the non-volatile computer-readable storage medium shown in the present disclosure may be, but not limited to, one or any combination of electric, magnetic, optical, electromagnetic, infrared, and semi-conductive system, apparatus, and device. More specific examples of the non-volatile computer readable storage medium include, but not limited to: an electrical connection having one or more wires, a portable computer magnetic disk, a hard disk, a random access memory (RAM), a read only memory (ROM), an erasable programmable read only memory (EPROM) or flash memory, an optical fiber, a portable compact disc read only memory (CD-ROM), an optical storage device, a magnetic storage device, any suitable combination of the foregoing. In the present disclosure, the non-volatile computer readable storage medium may be any tangible medium that contains or stores a program, and the program may be used by or used in combination with an instruction execution system, apparatus, or device. In the present disclosure, the computer readable signal medium may include a data signal carrying computer readable program codes therein, with the data signal propagated in base band or as part of a carrier wave. Such a propagated data signal may take any of a variety of forms, including, but not limited to, an electromagnetic signal, an optical signal, or any suitable combination thereof. The computer readable signal medium may be any computer readable medium other than the non-volatile computer readable storage medium, and the computer readable medium may send, propagate, or transport a program used by or used in combination with the instruction execution system, apparatus, or device. Program codes contained on the computer readable medium may be transported by using any suitable medium, including but not limited to, wireless, electric wire, optical fiber cable, radio frequency (RF) and the like, or any suitable combination of the foregoing.

Other embodiments of the present disclosure will be apparent to those skilled in the art after those skilled in the art consider the specification and practice the technical solutions disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A video enhancement method, comprising:
   inputting M frames of images into a pre-established video processing model to obtain an enhanced image of at least one of the M frames of images, where M is an integer greater than 1, by:
   extracting features from the M frames of images to obtain at least one first-scale image feature; and
   for each first-scale image feature, performing the following:
   performing N-level down-sampling processing on the first-scale image feature to obtain a second-scale image feature, where N is an integer greater than 1;
   performing N-level up-sampling processing on the second-scale image feature to obtain a third-scale image feature, wherein an input of first-level up-sampling processing is the second-scale image feature, an input of ith-level up-sampling processing is an image feature obtained after performing superimposition processing on an output of (N+1−i)th-level down-sampling processing and an output of (i−1)th-level up-sampling processing, and a magnification of jth-level up-sampling processing is the same as a minification of (N+1−j)th-level down-sampling processing, where i is an integer between 2 and N, and j is an integer between 1 and N; and
   performing the superimposition processing on the third-scale image feature and the first-scale image feature to obtain an enhanced image corresponding to the first-scale image feature.

2. The method according to claim 1, wherein:
   the pre-established video processing model is obtained by training an original video processing model through a target loss;
   the original video processing model is configured to perform video enhancement processing on an video input to the original video processing model; and
   the target loss comprises multi-level scale loss, and each-level scale loss of the multi-level scale loss is loss of each level of up-sampling processing in the N-level up-sampling processing.

3. The method according to claim 2, wherein:
   the loss of each level of up-sampling processing is loss between a first image and a second image, and the first image is obtained by inputting M frames of sample images into the original video processing model for a corresponding level of up-sampling processing; and
   the second image is a target image of each level of up-sampling processing, and a resolution of the first image is the same as that of the second image.

4. The method according to claim 2, wherein training the original video processing model to obtain the pre-established video processing model comprises:
   acquiring multiple groups of M frames of sample images and at least one frame of enhanced sample image corresponding to each group of M frames of sample images;
   for each group of M frames of sample images, extracting features from the group of M frames of sample images to obtain at least one first-scale sample image feature;
   for each first-scale sample image feature, performing the following procedures:
   performing the N-level down-sampling processing on the first-scale sample image feature to obtain a second-scale sample image feature;
   performing the N-level up-sampling processing on the second-scale sample image feature to obtain a predicted output image corresponding to each level of up-sampling;
   for each level of up-sampling, using a difference between a target output image corresponding to each level of up-sampling and a predicted output image corresponding to the level of up-sampling as loss of the level of up-sampling; wherein a target output image corresponding to ith-level up-sampling is an input of (N+1−i)th-level down-sampling processing on an enhanced sample image corresponding to the group of M frames of sample images; and
   using a sum of the loss of each level of up-sampling as the target loss, and updating a network parameter value in the original video processing model according to the target loss.

5. The method according to claim 4, wherein each group of M frames of sample images corresponds to one frame of enhanced sample image, and the one frame of enhanced sample image is specifically an enhanced image corresponding to an intermediate frame of sample image of the group of M frames of sample images, where M is an odd number greater than 1.

6. The method according to claim 1, wherein a value of M is 3, 5, or 7.

7. The method according to claim 6, wherein before the inputting the M frames of images into the pre-established video processing model, the method further comprises:
   acquiring L frames of images in a video to be processed;
   adding frames of images respectively before a first frame of image and after the last frame of image of the L frames of images to obtain L+M−1 frames of images;
   dividing the L+M−1 frames of images into L groups of M frames of images, where L is an integer greater than M; and wherein, for each group of M frames of images, performing the step of inputting the M frames of images into the pre-established video processing model to obtain the enhanced image of the at least one of the M frames of images.

8. The method according to claim 1, wherein the performing the superimposition processing on the third-scale image feature and the first-scale image feature to obtain the enhanced image corresponding to the first-scale image feature comprises:
performing the superimposition processing on the third-scale image feature and the first-scale image feature to obtain a superimposed feature; and
converting the superimposed feature into an image feature with three channels to obtain the enhanced image corresponding to the first-scale image feature.

9. The method according to claim 1, wherein the performing the superimposition processing on the third-scale image feature and the first-scale image feature to obtain the enhanced image corresponding to the first-scale image feature comprises:
performing super-resolution processing after performing the superimposition processing on the third-scale image feature and the first-scale image feature to obtain a super-resolution image corresponding to the first-scale image feature.

10. The method according to claim 1, wherein a value of N is 4.

11. A video enhancement apparatus, comprising:
an image enhancement processor configured to:
input M frames of images into a pre-established video processing model to obtain an enhanced image of at least one of the M frames of images, where M is an integer greater than 1;
extract features from the M frames of images to obtain at least one first-scale image feature;
for each first-scale image feature, perform the following:
performing N-level down-sampling processing on the first-scale image feature to obtain a second-scale image feature, where N is an integer greater than 1;
performing N-level up-sampling processing on the second-scale image feature to obtain a third-scale image feature, wherein an input of first-level up-sampling processing is the second-scale image feature, an input of ith-level up-sampling processing is an image feature obtained after performing superimposition processing on an output of (N+1−i)th-level down-sampling processing and an output of (i−1)th-level up-sampling processing, and a magnification of jth-level up-sampling processing is the same as a minification of (N+1−j)th-level down-sampling processing, where i is an integer between 2 and N, and j is an integer between 1 and N; and
performing the superimposition processing on the third-scale image feature and the first-scale image feature to obtain an enhanced image corresponding to the first-scale image feature.

12. The apparatus according to claim 11, wherein:
the pre-established video processing model is obtained by training an original video processing model through a target loss;
the original video processing model is configured to perform video enhancement processing on a video input to the original video processing model; and
the target loss comprises multi-level scale loss, each level of scale loss of the multi-level scale loss is loss of each level of up-sampling processing in the N-level up-sampling processing.

13. The apparatus according to claim 12, wherein the loss of each level of up-sampling processing is loss between a first image and a second image, and the first image is obtained by inputting M frames of sample images into the original video processing model for a corresponding level of up-sampling processing, the second image is a target image of each level of up-sampling processing, and a resolution of the first image is the same as that of the second image.

14. An electronic device, comprising:
at least one hardware processor; and
a memory storing executable instructions that, when executed by the at least one hardware processor, direct the at least one hardware processor to input M frames of images into a pre-established video processing model to obtain an enhanced image of at least one of the M frames of images, where M is an integer greater than 1, by:
extracting features from the M frames of images to obtain at least one first-scale image feature; and
for each first-scale image feature, performing the following:
performing N-level down-sampling processing on the first-scale image feature to obtain a second-scale image feature, where N is an integer greater than 1;
performing N-level up-sampling processing on the second-scale image feature to obtain a third-scale image feature, wherein an input of first-level up-sampling processing is the second-scale image feature, an input of ith-level up-sampling processing is an image feature obtained after performing superimposition processing on an output of (N+1−i)th-level down-sampling processing and an output of (i−1)th-level up-sampling processing, and a magnification of jth-level up-sampling processing is the same as a minification of (N+1−j)th-level down-sampling processing, where i is an integer between 2 and N, and j is an integer between 1 and N; and
performing the superimposition processing on the third-scale image feature and the first-scale image feature to obtain an enhanced image corresponding to the first-scale image feature.

15. A non-transitory computer-readable storage medium having a computer program stored thereon, wherein the computer program, when executed by at least one hardware processor, implements the method according to claim 1.

16. The apparatus according to claim 12, wherein the image enhancement processor is further configured to:
acquire multiple groups of M frames of sample images and at least one frame of enhanced sample image corresponding to each group of M frames of sample images;
for each group of M frames of sample images, extract features from the group of M frames of sample images to obtain at least one first-scale sample image feature;
for each first-scale sample image feature, perform the following procedures:
performing the N-level down-sampling processing on the first-scale sample image feature to obtain a second-scale sample image feature;
performing the N-level up-sampling processing on the second-scale sample image feature to obtain a predicted output image corresponding to each level of up-sampling;

for each level of up-sampling, using a difference between a target output image corresponding to each level of up-sampling and a predicted output image corresponding to the level of up-sampling as loss of the level of up-sampling; wherein a target output image corresponding to ith-level up-sampling is an input of (N+1−i)th-level down-sampling processing on an enhanced sample image corresponding to the group of M frames of sample images; and using a sum of the loss of each level of up-sampling as the target loss, and updating a network parameter value in the original video processing model according to the target loss.

17. The apparatus according to claim 16, wherein each group of M frames of sample images corresponds to one frame of enhanced sample image, and the one frame of enhanced sample image is specifically an enhanced image corresponding to an intermediate frame of sample image of the group of M frames of sample images, where M is an odd number greater than 1.

18. The apparatus according to claim 11, wherein a value of M is 3, 5, or 7.

19. The apparatus according to claim 18, wherein, before the inputting the M frames of images into the pre-established video processing model, the image enhancement processor is further configured to:

acquire L frames of images in a video to be processed;

add frames of images respectively before a first frame of image and after the last frame of image of the L frames of images to obtain L+M−1 frames of images;

divide the L+M−1 frames of images into L groups of M frames of images, where L is an integer greater than M; and wherein, for each group of M frames of images, perform the step of inputting the M frames of images into the pre-established video processing model to obtain the enhanced image of the at least one of the M frames of images.

20. The apparatus according to claim 11, wherein the image enhancement processor is further configured to:

perform the superimposition processing on the third-scale image feature and the first-scale image feature to obtain a superimposed feature; and convert the superimposed feature into an image feature with three channels to obtain the enhanced image corresponding to the first-scale image feature.

* * * * *